(12) United States Patent
O'Brien et al.

(10) Patent No.: US 9,898,069 B1
(45) Date of Patent: Feb. 20, 2018

(54) POWER REDUCTION METHODS FOR VARIABLE SIZED TABLES

(71) Applicant: Amazon Technologies, Inc., Seattle, WA (US)

(72) Inventors: Kari Ann O'Brien, Austin, TX (US); Bijendra Singh, Cedar Park, TX (US); Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 98 days.

(21) Appl. No.: 15/087,291

(22) Filed: Mar. 31, 2016

(51) Int. Cl.
 *G06F 1/32* (2006.01)
 *H04L 12/743* (2013.01)

(52) U.S. Cl.
 CPC ........ *G06F 1/3275* (2013.01); *H04L 45/7453* (2013.01)

(58) Field of Classification Search
 CPC ........................... G06F 1/3275; H04L 45/7453
 See application file for complete search history.

(56) References Cited

U.S. PATENT DOCUMENTS

| | | | |
|---|---|---|---|
| 8,938,469 B1 * | 1/2015 | Keen .................. | H04L 45/7453 707/747 |
| 2003/0026259 A1 | 2/2003 | Brown | |
| 2012/0307640 A1 * | 12/2012 | Wackerly ................ | H04L 45/54 370/241 |

OTHER PUBLICATIONS

U.S. Appl. No. 15/148,947, filed May 6, 2016, Titled: Power Management of Routing Tables Using Horizontal Scaling.
U.S. Appl. No. 15/148,965, filed May 6, 2016, Titled: Power Management of Routing Tables Using Vertical Scaling.
U.S. Appl. No. 14/981,664, filed Dec. 28, 2015, Titled: Pipelined Evaluations for Algorithmic Forwarding Route Lookup.

* cited by examiner

*Primary Examiner* — Albert Wang
(74) *Attorney, Agent, or Firm* — Kilpatrick Townsend & Stockton LLP

(57) ABSTRACT

Disclosed are devices, systems, and methods for the use of memory including a data table configured to store a plurality of elements, wherein the plurality of elements are arranged into a plurality of buckets and each of the plurality of buckets comprising a plurality of entries. A first power domain can be associated with an entry of each bucket or with a first bucket. A second power domain can be associated with a second entry of each bucket or a second bucket. Processing logic can be configured to search for a particular value stored in an element of the plurality of elements by selecting buckets of the plurality of buckets and selecting at least one entry of each of the buckets. A programmable register can be used to select a powered state of the second power domain based on a configuration of the programmable register.

20 Claims, 11 Drawing Sheets

POWER REDUCTION METHODS FOR VARIABLE SIZED TABLES

BACKGROUND

Data tables can be used in various electronic and computer devices to store data in an organized manner so that specific data elements can later be retrieved. For example, network switches can contain large data tables that can include forwarding tables that can store and/or update the identifiers associated with forwarding of network data to other interconnected network devices. These identifiers can indicate efficient routes (or the next stop along such a route) to the other network devices. The size of these routing tables can becomes increasingly large when associated with large numbers of network devices. For various reasons (e.g., speed and cost) forward tables for a network device can be implemented on a singular integrated circuit die (e.g., an Application Specific Integrated Circuit (ASIC)). As such, a singular integrated circuit can be used to implement a network switch that can accommodate various numbers of interconnect network devices (e.g., tens, hundreds, thousands) and thus may have a fixed memory size for implementing on-die forwarding table(s). When utilizing an integrated circuit to supports thousands of interconnected network devices, for example, within a device that currently supports tens of devices, a large portion of the memory dedicated for implementing forwarding table(s) can be unused, causing excessive power draw by the network device to this unused memory. Thus, there is need for improvement in the field of data table power management.

BRIEF DESCRIPTION OF THE DRAWINGS

Various embodiments in accordance with the present disclosure will be described with reference to the drawings, in which.

DETAILED DESCRIPTION

Figure 1:
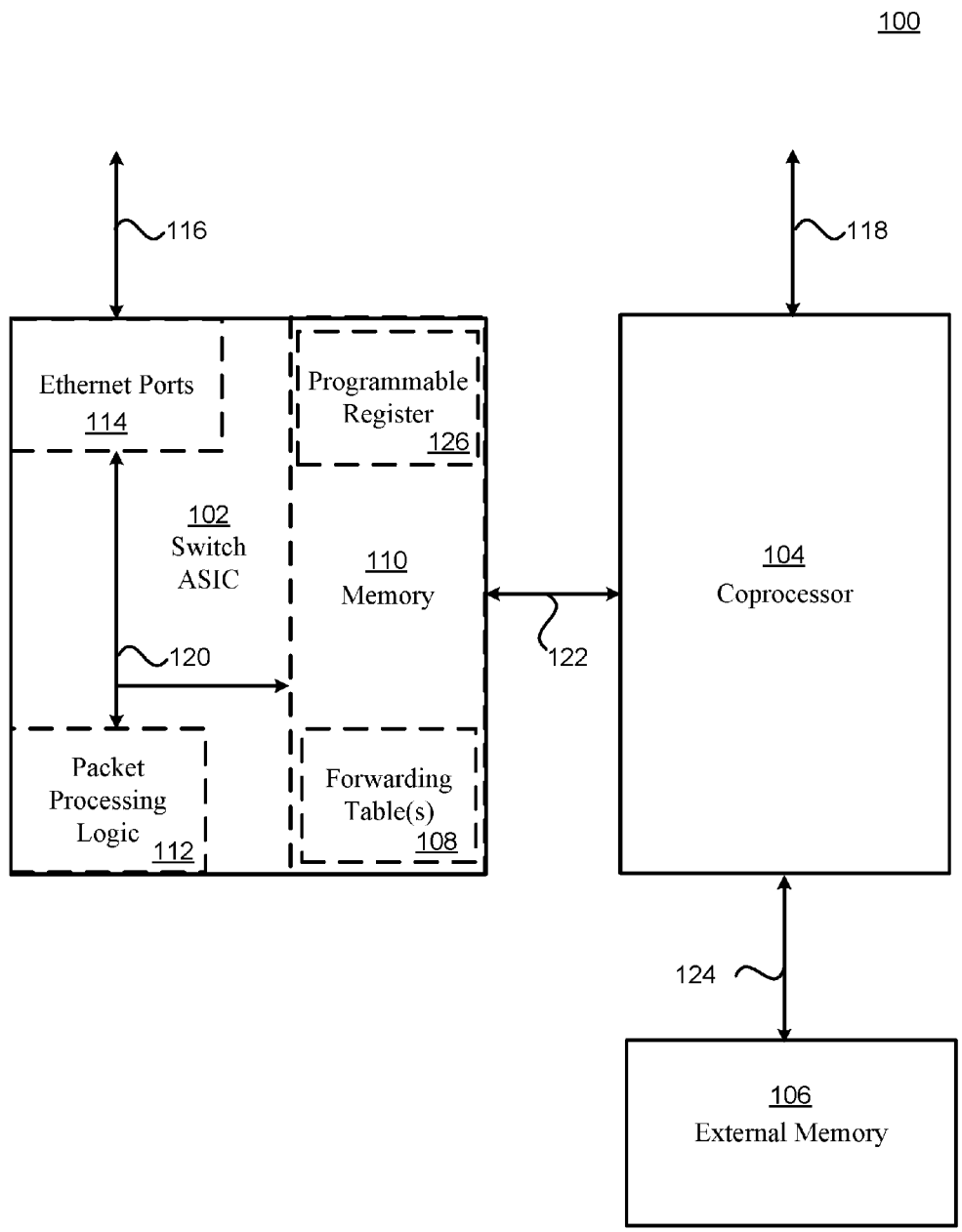
FIG. 1 illustrates an example network device that can include features of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Data tables are structures that can be used in many different computer devices for various purposes. Data tables can comprise many different elements and can be used to locate a specific element of the data table. Various algorithms, such as hash or key generation algorithms, can be used to store and/or retrieve data associated with specific elements of a data table according to a specific input data set. As one example, a forwarding table for a networking device can comprise a type of data table. A networking device, such as a networking switch, can receive data packets and route them to appropriate external network devices. One method for determining the next destination for such a transfer is through the use of a forwarding table. A forwarding table can comprise indicators of multiple network addresses, each corresponding to an external network device. A networking switch can receive a network packet as an input data set which can be parsed and associated with an element of a forwarding table. By locating the associated entry, the networking switch can obtain a forwarding indicator and then forward the network packet to the appropriate external networking device. For example, a final destination address can be parsed from the network packet. A forwarding table can be used to retrieve a destination of an external network device that the network packet can be transferred to intermediately on route to the final destination.

It should be understood that dependent upon the complexity and size of a network infrastructure, the size and complexity of a forwarding table for a network switch of a network infrastructure can become large and unwieldy. Additionally, it should be understood that forwarding tables for network devices such as network switches can be configured to operate at high speeds to support high-speed network transfer protocols such as 100G (Gigabit/second), 10G, 1G, or other. Because of the requirement for high-speed operation of forwarding tables to support, for example, forwarding of high-speed network traffic, a forwarding table can be implemented on a same integrated circuit die as a packet processor or other processing logic. Additionally, for economic and maintainability reasons, the use of this common integrated circuit die can be used to implement a network switch for use in various configurations for differing network sizes/locations (e.g., according to a number of network devices interfacing with the network device). As such, a singular design of integrated circuit can support network switches that are implemented in relatively large and relatively small network infrastructures. Consequently, the amount of memory of the integrated circuit can be selected to accommodate forwarding table(s) large enough to accommodate relatively large network infrastructures having many different networking devices. When such an integrated circuit is utilized in a relatively small network infrastructure, the entire memory space allocated for forwarding table(s) may not be fully utilized because the current forwarding table may be relatively small. The unused portions of memory dedicated to the routing table entries that are not used may still consume electrical power for maintenance or other operations. For these smaller network infrastructure implementations, this additional electrical power draw can result in excessive operating expenses to provide power for the unused memory, generate excessive heat for the device and the power providing circuitry, and lead to reduced maintenance schedules for the network device and supporting infrastructure to accommodate the additional power and heat.

FIG. 1 illustrates an implementation of a networking device 100, which can be a network switch, for example that can implement features of the disclosure. Networking device 100 can include a switch ASIC 102, a coprocessor 104, and/or external memory 106. Although SWITCH ASIC 102, coprocessor 104, and external memory 106 are illustrated as being separate entities, they can be physically disposed on a singular die and in any combination (e.g., the coprocessor 104 and switch ASIC 102 can be disposed on a singular die). Switch ASIC 102 can be configured to interface 116 with a plurality of differing networking devices (not shown). For example, the Switch ASIC 102 can interface with personal computers, network switches, network hubs, mobile devices, or other networking devices. Switch ASIC 102 can include one or more Ethernet Ports 114 to enable network communications with other networking devices (not shown). The Ethernet Ports 114 can enable network communications using Transmission Control Protocol/Internet Protocol (TCP/IP), Domain Name System (DNS), Hypertext Transfer Protocol (HTTP), Dynamic Host Configuration Protocol (DHCP) or other protocols. The Ethernet Ports 114 can also implement various speeds and methods of transmission such as 100 Gigabit (G), 10G, 1G, wired or wireless transmissions. Switch ASIC 102 can also include memory 110. Memory 110 can store forwarding table(s) 108.

Memory 110 can be shared by various blocks of Switch ASIC 102. Memory 110 and/or memory stored can be static Random Access Memory (RAM), dynamic RAM, double date rate RAM, flip-flops, or other types of memory to store data. Memory 110 can includes memory partitioned or otherwise selected for use by forwarding table(s) 108. Forwarding table(s) 108 can include elements for forwarding of various network packets that are received by networking device 100 via Ethernet ports 114, for example. Memory can also include a programmable register 126 that can include information regarding the configuration of forwarding table(s) 108, as will be further disclosed herein.

Switch ASIC 102 can also include packet processing logic 112 that can include logic gates, memory, processing cores, or other elements. Packet processing logic 112 can include a processor core such as an x86 or ARM® compatible processor core, for example, and/or can implement one or more fixed function units, Field Programmable Gate Arrays (FPGA), or other functional units. Various interconnects such as interconnect 120 can be used to pass information between the various blocks of switch ASIC 102. The interconnects (such as interconnect 120) can include point to point interconnect(s), common bus(es), or combinations thereof.

Coprocessor 104 can include a processor core such as an x86 or ARM® compatible processor core, for example, and/or can implement one or more fixed function units, Field Programmable Gate Array (FPGA), or the like. Coprocessor 104 can implement various functionalities associated with networking device 100. For example, Coprocessor 104 can be used to execute software that may or may not be stored in memory, such as external memory 106 and/or onboard memory (not shown). Coprocessor 104 can communicate with Switch ASIC 102 via interface 122. Interface 122 can include a Peripheral Component Interconnect (PCI), Serial Peripheral Interface (SPI), Universal Serial Bus (USB), a parallel interface, or various other topologies. Interface 124 between Coprocessor 104 and External memory 106 can similarly be configured with similar topologies.

Coprocessor 104, Packet processing Logic 112, Memory 110, External Memory 106, and/or forwarding table(s) 108 can be used to implement a control plane for networking device 100. A control plane, as used herein, can be a functional representation of a networking device that concerns routing or control of network packets. In other words, a control plane can be used to orchestrate the movement of data packets through a networking device or through a network comprising multiple devices. Ethernet Ports 114 (and/or Coprocessor 104, Packet Processing Logic 112, Memory 110, External Memory 106) can be used to implement a data plane for networking device 100. A data plane, as used herein, can be a functional representation of a networking device concerning carrying/movement of data packets. In other words, the control plane directs the traffic through a network or networking device while the data plane performs the actually movement of the data. If a data plane is correlated to a bus, the control plane can be correlated to a bus driver.

Forwarding table(s) 108 can be used to indicate network device addresses, distances between networking device 100 and particular network destinations, or other information for use in forwarding of network data packets. As the network topology changes, forwarding table(s) 108 can be updated accordingly to reflect the changes and optimize the addresses to improve the efficiency of transfer of data packets through the network infrastructure. Forwarding table(s) 108 can be used by the networking device 100 to optimize prioritization of the transfer of data packets along with, for example, Quality of Service (QOS) or other optimizations. An Access Control List (ACL) can be a list of permissions that can further enable certain port numbers and/or IP addresses to be available. The ACL and/or forwarding table(s) 108 can each be associated with a counter table to temporarily or otherwise store statistical information concerning the access of certain nodes and/or devices that networking device 100 interfaces to, for example. Although, only the ACL and forwarding table(s) 108 are used here as an example, it should be understood that various other functions (even outside of a networking device) can be associated with and/or use the functionality of a data table or similar memory construct. As one such example, a device cache can use a data table to increment cache hits and/or misses. As such, this disclosure is not limited to a data table for use with only a networking device such as networking device 100, but can be used in a wide variety of devices for a wide variety of purposes. Many data tables and other memory constructs can benefit from the disclosure herein. As described herein, data tables stored within switch ASIC 102 can be relatively large to enable commonality of switch ASIC 102 for use with variously implemented network devices (such as networking device 100). Depending upon the number of network devices within a particular implementation of a network device within a network infrastructure, the number of entries of forwarding table 108 can very. If all of the entries of forwarding table 108 are not utilized, then all of memory allocated for forwarding table 108 within switch ASIC 102 may not be used, but may still be powered.

Thus, memory that is not utilized may consume power and may needlessly lead to increased power draw by a networking device.

Figure 2:
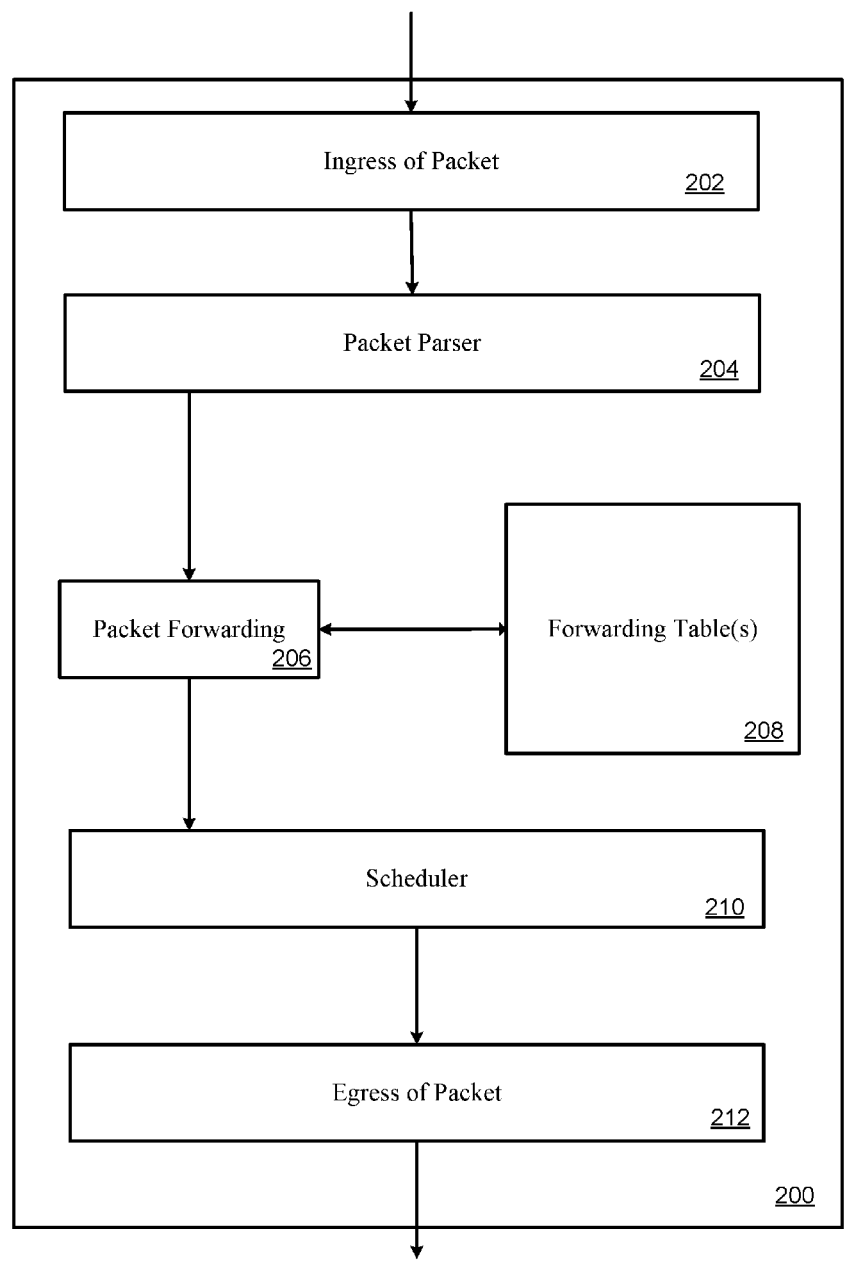
FIG. 2 illustrates an example packet processing logic that can include features of the disclosure.

FIG. 2 illustrates a flowchart 200 for operation of a packet processor configured to process network packets. The packet processor can be implemented via packet processing logic 112 of networking device 100, for example. The packet processor can also be implemented using pipelined operations to support packet processing speeds for high-speed network data transfer operations, including forwarding route lookups and other packet processing operations. The packet processor can be implemented to provide forwarding of network packets as part of the data plane so that forwarding may be performed without software-based techniques.

As data is received via network interfaces, such as ethernet ports 114, stage Ingress of packet 202 can provide a physical layer (PHY) interface and ethernet Media Access Control (MAC) layer interface. These interfaces may evaluate a stream of network data received at the packet processor to detect valid streams and segment the stream into datagrams (e.g., packets/frames). For instance, the PHY layer may receive and transmit data across physical connections (e.g., such as electrical signals received over twisted-pair coaxial cable or optical signals received over optical fiber) via ethernet ports 114. The PHY layer may implement different techniques dependent on the speed or type of network interface configuration (e.g., ethernet 10 base-T, 100 base-TX, and 100 base-T forms), such as encoding, multiplexing, synchronization, clock recovery, and/or data serialization. Various signaling standards, such as IEEE 802.3, may govern the performance of the PHY layer consistent with the open systems interconnection (OSI) model for communications. The MAC layer may delimit frames and packets from the stream of data. Error checking may also be implemented at the MAC layer, checking for different errors, such as frame check sequence (FCS), interframe gap enforcement, and frame preambles.

Packet parser 204 can receive network packets from ingress of packet 202 and separate the packet header from the packet payload. Packet parser 204 can parse the packet header to determine and/or extract data for making forwarding decisions for the packet. For example, packet parser 204 can extract different layer headers (e.g., L2, L3, and L4 headers) included in an Internet protocol (IP) version 4 packet, such as the source MAC address, the destination MAC address, the source IP address, the destination IP address, and port numbers. The extracted data may then be utilized perform lookups too many forwarding decisions at packet forwarding 206.

Packet forwarding 206 can access data stored in forwarding tables 208 to make forwarding and tunneling decisions for network packet based on information in the packet header (e.g., packet metadata) extracted by packet parser 204. For example, packet forwarding 206 can perform lookups for data in layer 2 (L2) portions of the packet to perform L2 forwarding. L2 forwarding may access a MAC address table in forwarding tables 208 to perform two lookups (which may be in parallel or in series). The first lookup may be performed with a key extracted from the packet header at packet parser 204 (e.g., a VLAN and source MAC address), to determine whether an entry for the packet is present in forwarding table 208. If the source MAC address is unknown, then a mapping determination may be made to map the source MAC address to a port identified in the packet header. If the MAC address is known but attached to a different port than indicated the MAC address table, than an operation may be performed to move the source MAC address to the port identified in the packet header. Otherwise, the MAC address is known in the MAC address table. Another look up to the MAC address table may also be performed at another key (the VLAN in the destination MAC address). The network packet may be routed if the MAC address table contains an entry for the destination MAC address owned by the networking device 100 (otherwise other operations may be performed, such as trapping the network packet for the CPU, bridging the packet out of a listing interface, or flooded out of all ports and an STP forwarding state).

Packet forwarding 206 can also perform lookups for data in layer 3 (L3) portions of the packet to perform L3 forwarding. For example, IP headers for the packet may be evaluated respect to entries and tables such as a routing or next top table, to determine forwarding to be performed. The previous examples of packet forwarding 206 is not exhaustive, as many other forwarding systems may be made, including, but not limited to, forwarding for spanning tree protocol (STP) state checking, access port VLAN handling, VLAN membership checking, MAC2ME lookup, broadcast/multicast forwarding to a host CPU for the switch, tunnel start/termination lookup, longest prefix match, source MAC lookup, learn filtering, learn requests, moved source MAC checking, multiprotocol label switching (MPLS) label lookups, traffic class mapping, time-to-live (TTL) checks, packet actions based on ingress/egress access control lists (ACL), and front/or various other destination resolution lookups. As packet forwarding 206 make forwarding decisions about the packet, the decisions are maintained as packet metadata. The packet metadata can be provided to scheduler 210 for scheduling determinations.

Forwarding tables 208 may be implemented in one or multiple storage devices, such as various memory devices (e.g., a CAM, such as TCAM, and/or random access memory) to store table data for performing different routing decisions. Tables may include a VLAN table, MAC address table, routing table, adjacency table, next top table, tunnel start table, virtual routing and forwarding identifier table, tunnel termination table, and/or actions table. Each of these different tables may be utilized to retrieve or determine packet forwarding decisions, tunneling decisions, and associated modifications that may need to be made to network packets.

Scheduler 210 can control the buffering of packets and scheduling of operations within a packet processor. For example, scheduler 210 can implement a memory management unit to allocate available memory segments for buffering stored packets. Scheduler 210 can also implement a memory management unit to allocate packets from a buffer for final processing and egress. Scheduler 210 can provide the appropriate metadata for a packet. Once a packet has been scheduled, egress of packet 212 can utilize a PHY interface and a MAC layer interface to transmit network packets as network data via an appropriate physical connection.

Figure 3:
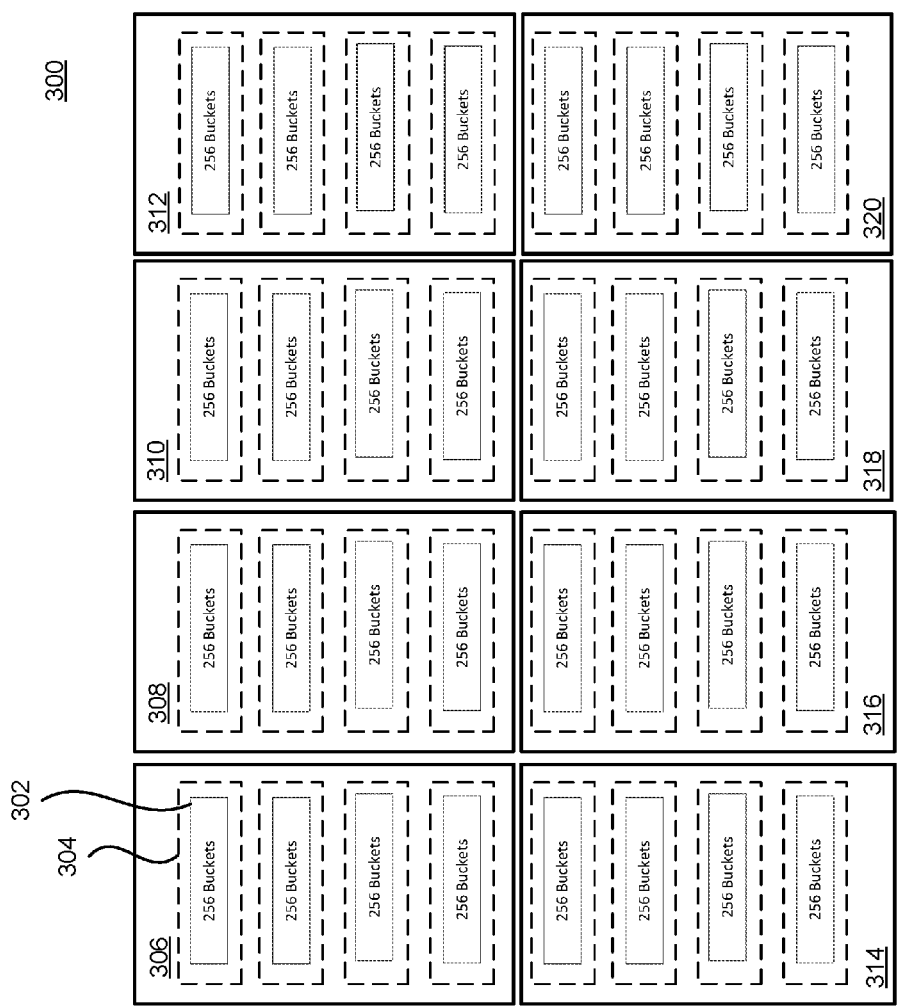
FIG. 3 illustrates an example logical organization of memory for use with a forwarding table of a network device.

FIG. 3 illustrates an example logical block diagram of memory organizations of a routing hash table maintaining forwarding routes that can utilize features of the disclosure. For example, a hash table may be organized into multiple segments of buckets such as segment of buckets 302. Each of the segment of buckets, such as 302 can contain a number of entries. Segment of buckets 302 can be mapped to different segments of a hash table. Bucket mappings may differ for processing IPv4 or IPv6 network packets (though the underlying bucket entry data may stay the same). For example, IPv4 segments 306, 308, 310, 312, 314, 316, 318, and 320 can each include a different number of buckets, such as 1024 buckets per segment and eight segments, as illustrated in FIG. 3 (i.e., 256 buckets*4=1024 buckets). IPv6 segment 304 can include 256 buckets per segment, and 32 segments. Each segment may have an associated identifier. To determine which segment corresponds to which possible key or has, the same distribution function or mechanism may be utilized as when storing a forwarding route in order to calculate the segment identifier. Note that the segment identifiers for IPv4 segments and IPv6 segments may differ.

Figure 4:
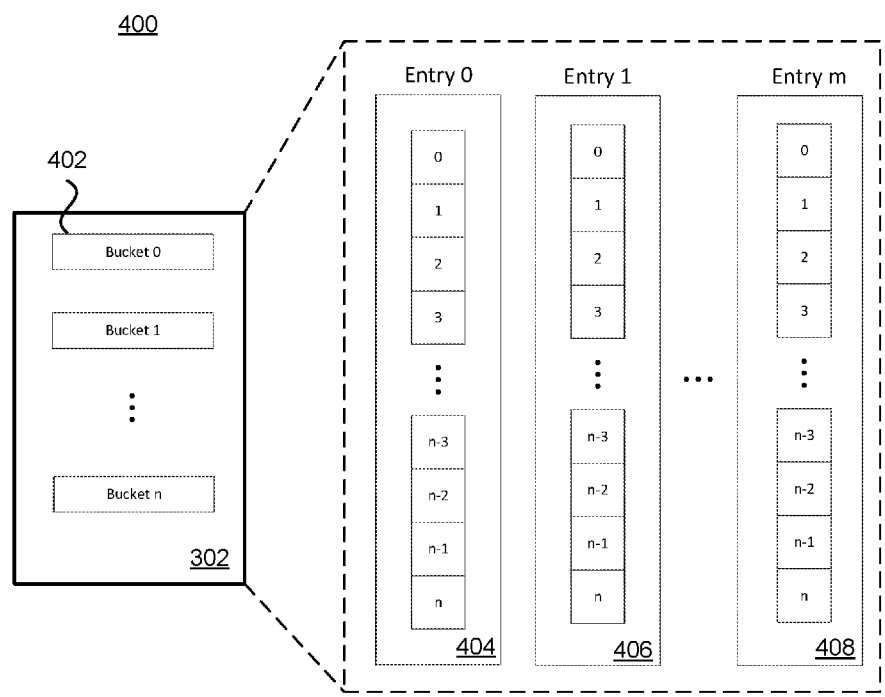
FIG. 4 illustrates a further delineation of the example logical organization of memory for use with a forwarding table of a network device illustrated in FIG. 3.

FIG. 4 illustrates an example further delineation of bucket 402. Bucket 402 can be a bucket of segment of buckets 302 of FIG. 3, for example. As illustrated, each bucket of the segment of buckets illustrated in FIG. 3 can contain multiple entries. These entries are enumerated 404, 406, and 408 in FIG. 4. Each of entries 404, 406, and 408 can contain various information to identify forwarding routes such as addresses, pointers, valid fields for trie bitmaps, or other data structures that may be implemented to store aggregated or other routes and/or to determine a next hop address for a forwarding route, as disclosed herein.

Various methods and schemas can be used to associate a data set with a bucket 402 and/or an entry. As one example, a hash function can be used to associate a data set with a particular bucket by, for example, obtaining a hash value that can be associated with an identifier of one or more buckets. The same hash function (or a different function) can be used to obtain a key that uniquely identifies an entry of a bucket. Two separate hash functions can be used to identify a bucket and an entry. Alternatively, digital trees or other mapping functions can be used to associate a data set with a particular bucket and or entry. As an additional feature of the example memory structure, migration can be used to move data between entries or buckets. For example, a hash value can be associated with a plurality of buckets that can, for example, each be associated with a different segment of buckets. When a particular bucket is at capacity, a value can be migrated to another bucket associated with the hash value. In this manner, the multiple buckets and/or entries can be located given a singular hash value, key, and/or combination. Migration can be used to balance the usage of such buckets or entries so that elements are move event populated across associated buckets and/or entries. Alternatively, migration can be a separate function from the hash and/or key generation such that migration can occur as an independent process and move data between associated buckets and/or entries independently of the hash and/or key generation functions populating and or reading from bucket(s) and/or one or more entries.

As one example of migration when populating one or more buckets, a hash function can be used to generate a hash value that can identify an identifier associated with a particular bucket (or group of buckets). When populating the entries of the bucket(s), a sequential or other schema can be used such that a next available entry is used to store a data value. When locating an already stored data value, a separate function can be used to uniquely associate the data set with an entry of the bucket(s). As one example, a key generation function can be used to associate the data value with a key generated from the data set.

Various other rules and or functions can be used to distribute or allocate data across memory space containing a forwarding table. For example, a rule can prefer to populate entry zero of each bucket rather than populating entry 1 of a bucket. Such a rule would result in a more even distribution of data across entry 0s in the data structure and disfavor the population of any of entry 1 of a bucket. Various methods can be used to effectuate such a distribution. For example, a function can be used to locate a bucket that does not have entry 0 populated. Alternatively, a secondary function can be used to move data that normally would be stored within an entry 1 to an open Entry 0. These methods can communally be referred to as migration functions and can be used to modify the distribution of data within the data structure. It should be understood that these migration functions can take many forms and can be used to distribute data in many different ways. For example, instead of populating entry 1 elements, a particular bucket or group of buckets can instead to be populated over another bucket or group buckets. Likewise, a particular group of entries could be populated over another group of entries. Although buckets and entries are used in the illustrated example of FIG. 4, many different organizations and data structures can be used to effectuate forwarding tables and other data tables without deviating from the disclosure within.

Figure 5:
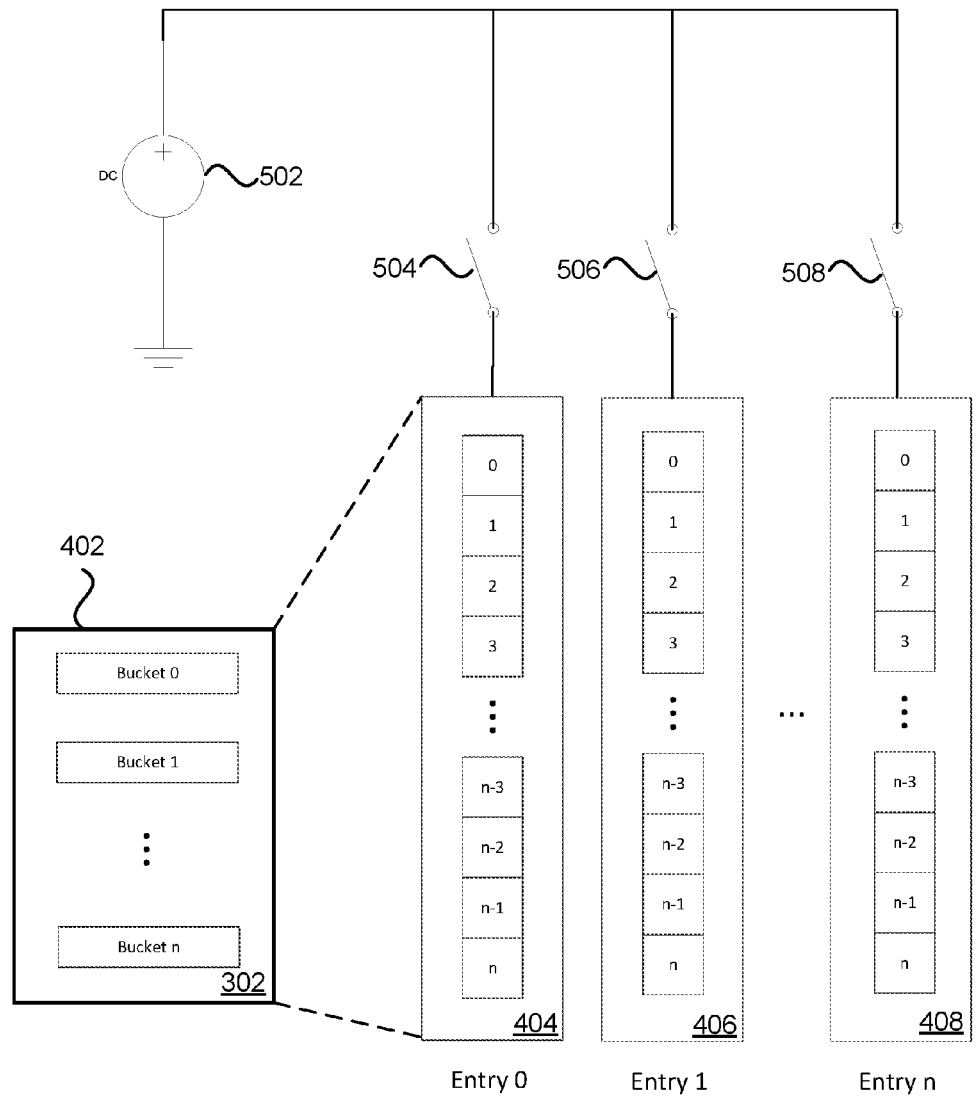
FIG. 5 illustrates several additional features regarding the further delineation of the example logical organization illustrated in FIG. 4 regarding power logic.

System 500 wherein a data table is organized in similar fashion as system 400 of FIG. 4. System 500, includes a power source 502 and various switches 504, 506, and 508. Each of switches 504, 506, and 508 can be a mechanical, solid-state, or other switch. Alternatively, switches 504, 506, and 508 can instead be a variable power transfer mechanism such as an inductive link, switching power supply, or other. Functionally, switch 504 can separate entry 0 404 from power source 502. By changing the state of switch 504, the powered state of entry 0 404 can be changed. Likewise, switch 506 can change the powered state of entry 1 406 and switch 508 can change the powered state of entry n 408. Illustrated in FIG. 5, each of the entries 404, 406, and 408 can constitute a separate power domain with powered states controlled by each of switches 504, 506, and 508.

System 500 can combine the migration functionality disclosed for system 400 with functionality of the individually controllable power domains to reduce an amount of power required to maintain a forwarding table. As one example, a total size of the forwarding table can be adjustable by a register (now shown). Depending upon a configuration of the register (such as a value stored by the register), a status of switches 504, 506, and 508 can be altered to change the powered states of entries 404, 406, and 408. This change in configuration of the register can occur when system 500 is booted, activated, and/or powered on. Alternatively, the configuration of the register can be configured dynamically to alter the size of a forwarding table having entries 404, 406, and 408. It should be understood that each of switches 504, 506, and 508 can be associated with additional elements and/or buckets. In this manner, a forwarding table can be organized into different slices having various power domains that can be configured in various ways. By reducing a number of elements that the forwarding table represents, an amount of power used to maintain and/or update the forwarding table can be adjusted. Processing logic used to populate and/or locate specific element(s), as disclosed herein, can also be adjusted and/or configured to account for different values of the register. For example, a number of entries per bucket can be adjusted and/or a number of buckets can be adjusted. The processing logic can account for these changes when either populating, locating, and/or migrating data within the forwarding table.

As one example, migration rules can be optimized to populate all entry 0 elements of each bucket prior to populating entry 1 elements. Additionally, since only entry 0 elements may be used for this example, switches 506 and 508 can be opened or otherwise modified to reduce power provided to entry 1 elements in entry n elements. The powered state of memory can be altered via switches 506 and 508, for example, to either increase or decrease a power draw of the memory. It should be understood that as the entry 0 elements reach capacity, the system can then provide power via switch 506 to entry 1 406 and proceed to populate the entry 1 elements. As well as populating these various powered elements, the same type of schema can be used for reading data from the elements. This is especially true if the memory elements are persistent such that they do not lose their state when unpowered. However, disclosed features herein can still reduce power draw of the total system. In addition to the individual elements being powered, various memory interfaces, hash, key generation, and/or migration circuitry can also be powered via switches 504, 506, and 508. For example, migration circuitry needed to populate or read from the entry 1 elements can also be powered via switch 506.

Figure 6:
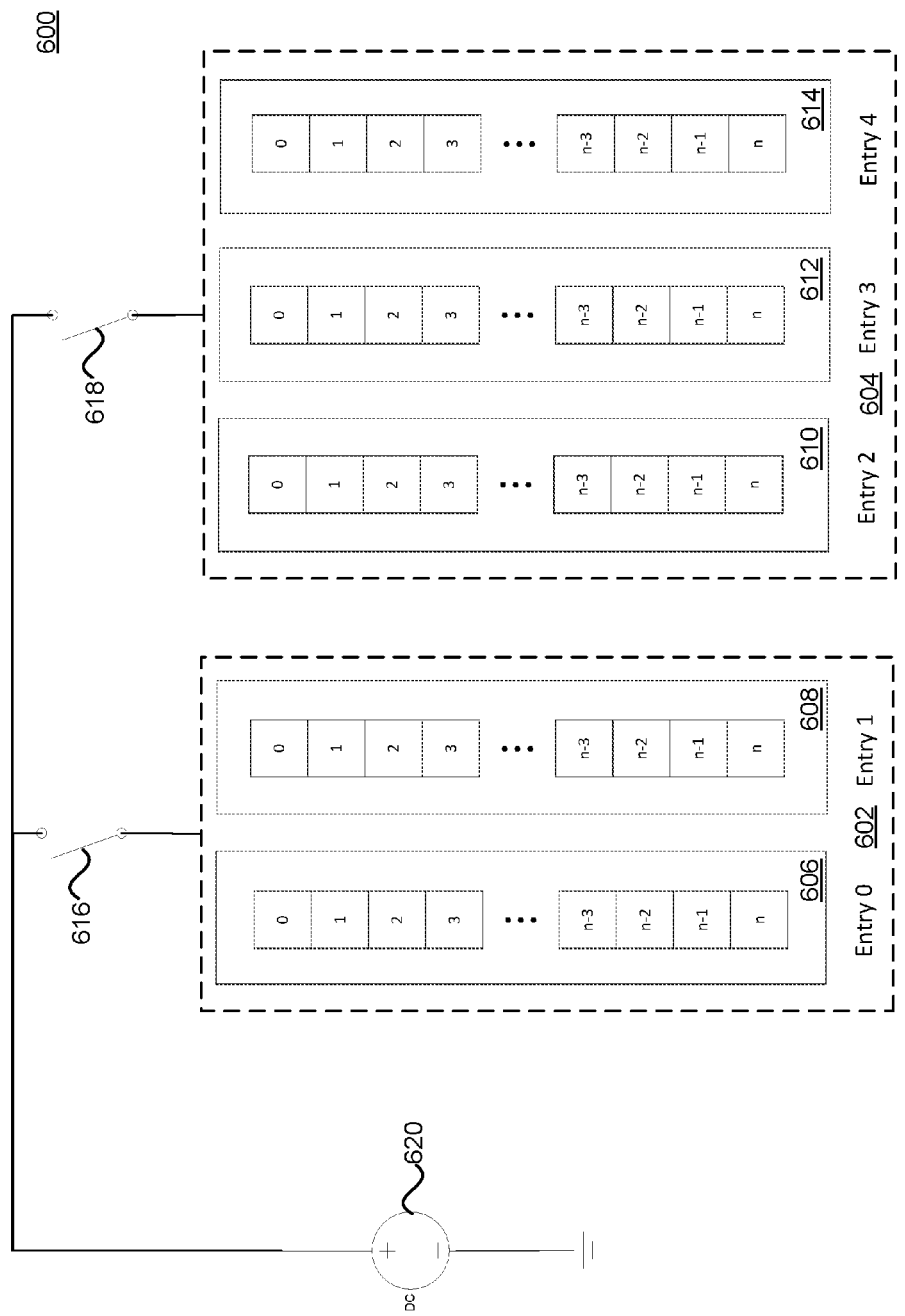
FIG. 6 illustrates several additional example features regarding the use of power domains with an example memory organization.

FIG. 6 illustrates a system 600 embodying additional features of the disclosure. In FIG. 6, entry 0 606 and entry 1 608 are grouped within power domain 602. Additionally, entry 2 610, entry 3 612, and entry 4 614 are grouped within power domain 604. Thus, by manipulating switch 618, the power provided to each of entries 610, 612, and 614 from power supply 620 can be altered, changing the powered state of power domain 604. Furthermore, entry location, bucket location, entry populating, bucket populating, and/or migration rules can be modified to account for the various states of switches 616 and 618. System 600 illustrates that entries, buckets, segments, or other memory partitions can be organized in various manners with respect to various power domains in order to selectively power on or power off varying slices of memory space. For example, referring back to FIG. 3, segments 380 and 316 can be associated with a single power domain. Alternatively, segments 314, 316, 318, and 320 can be associated with a power domain.

Figure 7:
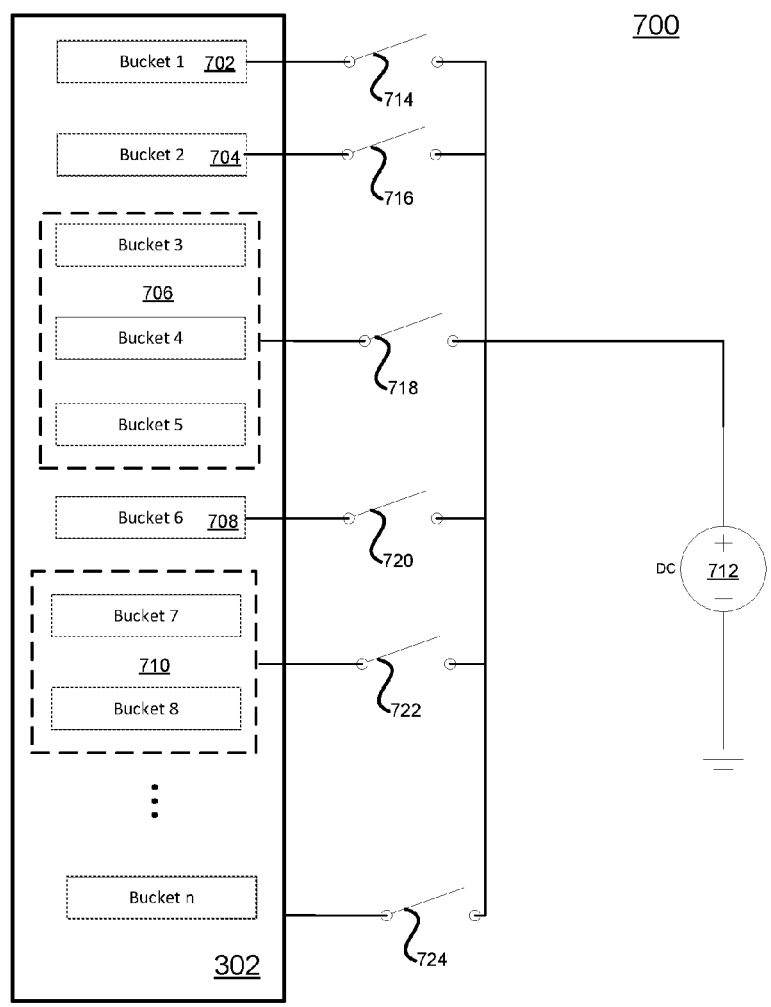
FIG. 7 illustrates several more additional example features regarding the use of power domains with an example memory organization.

FIG. 7 illustrates a system 700 wherein various buckets 302 are differently grouped into power domains. A power supply 712 is illustrated to provide power to each of these power domains. Upon activation of switch 714 power provided to bucket 1 702 can be altered. Likewise actuating switch 716 can alter the amount of power provided to bucket 2 704. Switch 718 can be used to alter power provided to power domain 706 which includes bucket 3, bucket 4, and bucket 5. Actuating switch 722 can alter the amount of power provided power domain 710 which includes bucket 7 and bucket 8. Actuating switch 724 can alter the amount of power provided to all of buckets 302. Using the features disclosed herein, various power domains can be used in a nested or parallel schema. For example, buckets and elements can each be grouped into various power domains to provide additional granularity for adjusting power draw of a system. By operating these various power domains in conjunction with associated migration rules, memory of a device can be dynamically populated to correspond with power domains of the device. Reduced power can be provided to power domains associated with non-populated memory to reduce the power draw by device.

Additionally, each of the power domains disclosed can be associated with a separate memory device such as an integrated circuit chip or a die. For example, Entry 1 elements can be grouped onto an individual memory chip. Such an arrangement can reduce the complexity associated with the hardware implementation and memory partitioning of such a device. These memory chips can be associated with a singular switch circuit such as switch ASIC 102, for example. In this manner, a singular ASIC can still be used for a variety of network devices and still benefit from the features disclosed herein.

Figure 8:
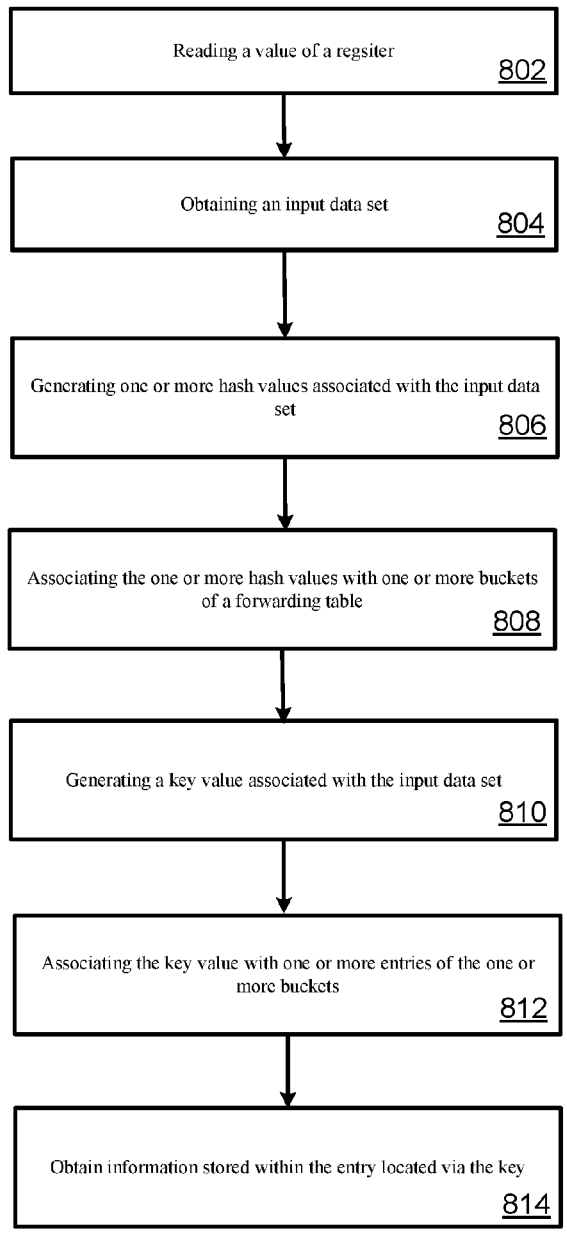
FIG. 8 illustrates an example method including features of the disclosure reading from the example logical organization illustrated in FIG. 4.

FIG. 8 illustrates a flowchart 800 embodying a method including features of the disclosure. Flowchart 800 begins by reading a value of register 802. The register can be programmable register 126, for example, can be used to modify a configuration of several power domains. The power domains can be any of the power domains disclosed via FIGS. 5-7, for example. Next, an input data set can be obtained 804. This input data set can be obtained from a received network data packet by a device, for example, or via other means. Hash value(s) can then be generated from the input data set 806 and associated with one or more buckets of a forwarding table 808. As disclosed herein, the association of the hash value(s) with the one or more buckets can occur sequentially across various segments, each containing buckets, or in parallel, such that multiple buckets are associated concurrently.

At 810, key value(s) can be generated from the input data set. It should be understood that the key value(s) can be generated concurrently with the one or more hash values. The key value(s) can then be associated with a data value stored within an entry of the one or more buckets 812. At 814, information stored within the entry can be located through the use of the key. One method of obtaining the information stored within an entry is by inspecting the one or more entries of the one or more buckets to locate a longest prefix match value. A longest prefix match value can indicate that the information provided in a specific element of a forwarding table contains the most specific forwarding information for forwarding of a data value. Such information can be used to determine forwarding information for a network packet, as disclosed herein.

Figure 9:
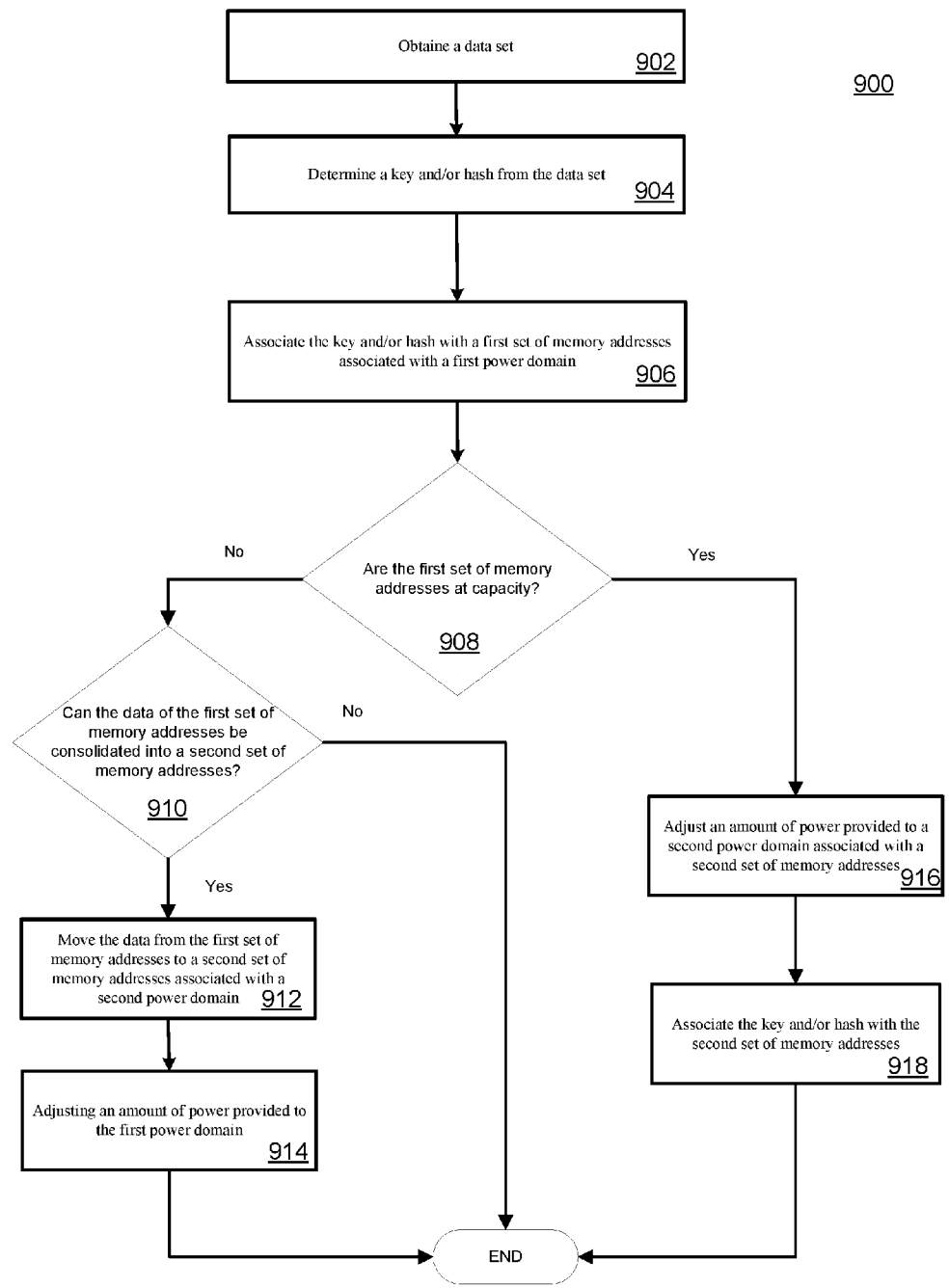
FIG. 9 illustrates an example method for dynamically altering power domains of a memory organization using features of the disclosure.

FIG. 9 illustrates a flowchart 900 embodying a method including several features of disclosure that can be used to dynamically adjust power domains of a data table. Flowchart 900 includes step 902 of obtaining a data set. The obtained data set can be a new or replacement elements of a data table, an identifier of a file for storage, a cryptography key, or any other data set to be associated with an element of a data table. At step 904, a first key and/or hash value can be determined using the data set. The key and/or hash value can be obtained from one or more hash functions, using a function or method described herein, or through various other means. The key and/or hash value can be used to associate the data set with a particular entry or multiple elements in a data table at step 906. For example, the one or more elements can be organized in a bucket or a set of entries. The one or more elements can also be associated with a first set of memory addresses and also a first power domain. At decision point 908, it can be determined if the first set of memory addresses (associated with the first power domain) are at capacity. The capacity can be a specified load level or a lack of memory space available in the first set of memory addresses. If it is determined that the first set of memory addresses are not at capacity, a decision point can be entered where it is determined if data of the first set of memory addresses should be consolidated into a different power domain. For example, it may be determined that a the first set of memory addresses are minimally loaded and therefore power savings can be obtained by consolidating data of the first power domain into a different power domain. If this determination is made, then the process can proceed to move data from the first set of memory addresses to a second set of memory addresses 912. The second set of memory addresses can be associated with a second power domain and/or with the data set. After the data is moved from the first power domain, an amount of power provided to the first power domain can be adjusted 914 in order to, for example, reduce power consumption by reducing power provided to the first power domain.

If, however, the first set of memory addresses are found to be at capacity via decision point 908, the method can proceed to adjust an amount of power provided to a second power domain which can, in turn, be associated with a second set of memory addresses 916. For example, the second power domain can be powered up to become accessible. By providing power to the second set of memory addresses, additional memory can become available for storing a data table, for example. At step 918, the key or hash value can be associated with one or more memory addresses of the second set of memory addresses.

Figure 10:
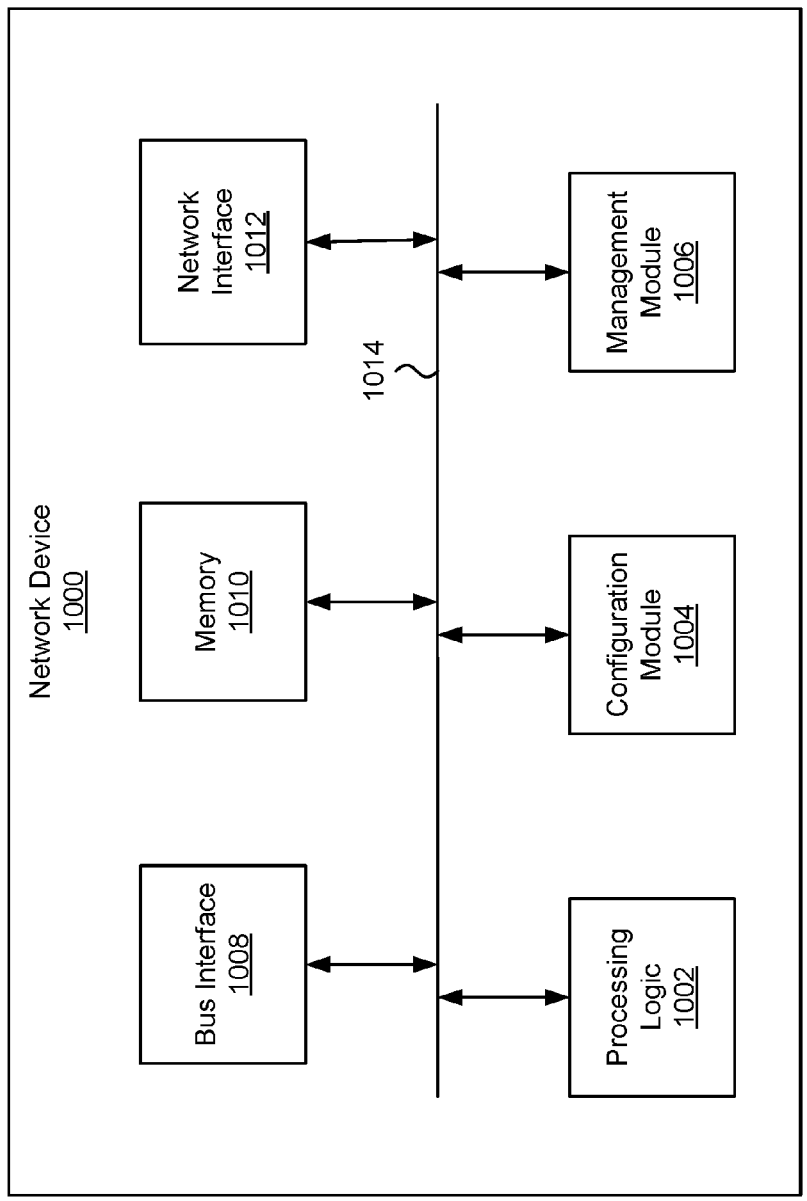
FIG. 10 illustrates aspects of an example environment of a network device for implementing aspects in accordance with some embodiments.

FIG. 10 illustrates an example of a network device 1000. Functionality and/or several components of the network device 1000 may be used without limitation with other features disclosed elsewhere in this disclosure, without limitations. For example, features of networking device 100, the method of operation of a packet processor illustrated by flowchart 200, and/or the forwarding table/power domain features of FIGS. 3-9 can be implemented by network device 1000. A network device 1000 may facilitate processing of packets and/or forwarding of packets from the network device 1000 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 1000 may be the recipient and/or generator of packets. In some implementations, the network device 1000 may modify the contents of the packet before forwarding the packet to another device. The network device 1000 may be a peripheral device coupled to another computer device, a switch, a router or any other suitable device enabled for receiving and forwarding packets.

In one example, the network device 1000 may include processing logic 1002, a configuration module 1004, a management module 1006, a bus interface module 1008, memory 1010, and a network interface module 1012. These modules may be hardware modules, software modules, or a combination of hardware and software. In certain instances, modules may be interchangeably used with components or engines, without deviating from the scope of the disclosure. The network device 1000 may include additional modules, not illustrated here, such as components discussed with respect to the nodes disclosed in FIG. 11. In some implementations, the network device 1000 may include fewer modules. In some implementations, one or more of the modules may be combined into one module. One or more of the modules may be in communication with each other over a communication channel 1014. The communication channel 1014 may include one or more busses, meshes, matrices, fabrics, a combination of these communication channels, or some other suitable communication channel.

The processing logic 1002 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 1002 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 1002 may be stored on a computer-readable storage medium, for example, in the form of a computer program. The computer-readable storage medium may be non-transitory. In some cases, the computer-readable medium may be part of the memory 1010.

The memory 1010 may include either volatile or non-volatile, or both volatile and non-volatile types of memory. The memory 1010 may, for example, include random access memory (RAM), read only memory (ROM), Electrically Erasable Programmable Read-Only Memory (EEPROM), flash memory, and/or some other suitable storage media. In some cases, some or all of the memory 1010 may be internal to the network device 1000, while in other cases some or all of the memory may be external to the network device 1000. The memory 1010 may store an operating system comprising executable instructions that, when executed by the processing logic 1002, provides the execution environment for executing instructions providing networking functionality for the network device 1000. The memory may also store and maintain several data structures and routing tables for facilitating the functionality of the network device 1000.

In some implementations, the configuration module 1004 may include one or more configuration registers. Configuration registers may control the operations of the network device 1000. In some implementations, one or more bits in the configuration register can represent certain capabilities of the network device 1000. Configuration registers may be programmed by instructions executing in the processing logic 1002, and/or by an external entity, such as a host device, an operating system executing on a host device, and/or a remote device. The configuration module 1004 may further include hardware and/or software that control the operations of the network device 1000.

In some implementations, the management module 1006 may be configured to manage different components of the network device 1000. In some cases, the management module 1006 may configure one or more bits in one or more configuration registers at power up, to enable or disable certain capabilities of the network device 1000. In certain implementations, the management module 1004 may use processing resources from the processing logic 1002. In other implementations, the management module 1006 may have processing logic similar to the processing logic 1002, but segmented away or implemented on a different power domain than the processing logic 1002.

The bus interface module 1008 may enable communication with external entities, such as a host device and/or other components in a computing system, over an external communication medium. The bus interface module 1008 may include a physical interface for connecting to a cable, socket, port, or other connection to the external communication medium. The bus interface module 1008 may further include hardware and/or software to manage incoming and outgoing transactions. The bus interface module 1008 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 1008 may include the physical layer for any of these bus protocols, including a connector, power management, and error handling, among other things. In some implementations, the network device 1000 may include multiple bus interface modules for communicating with multiple external entities. These multiple bus interface modules may implement the same local bus protocol, different local bus protocols, or a combination of the same and different bus protocols.

The network interface module 1012 may include hardware and/or software for communicating with a network. This network interface module 1012 may, for example, include physical connectors or physical ports for wired connection to a network, and/or antennas for wireless communication to a network. The network interface module 1012 may further include hardware and/or software configured to implement a network protocol stack. The network interface module 1012 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 1000 may include multiple network interface modules, each configured to communicate with a different network. For example, in these implementations, the network device 1000 may include a network interface module for communicating with a wired Ethernet network, a wireless 802.11 network, a cellular network, an Infiniband network, etc.

The various components and modules of the network device 1000, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 11.

Figure 11:
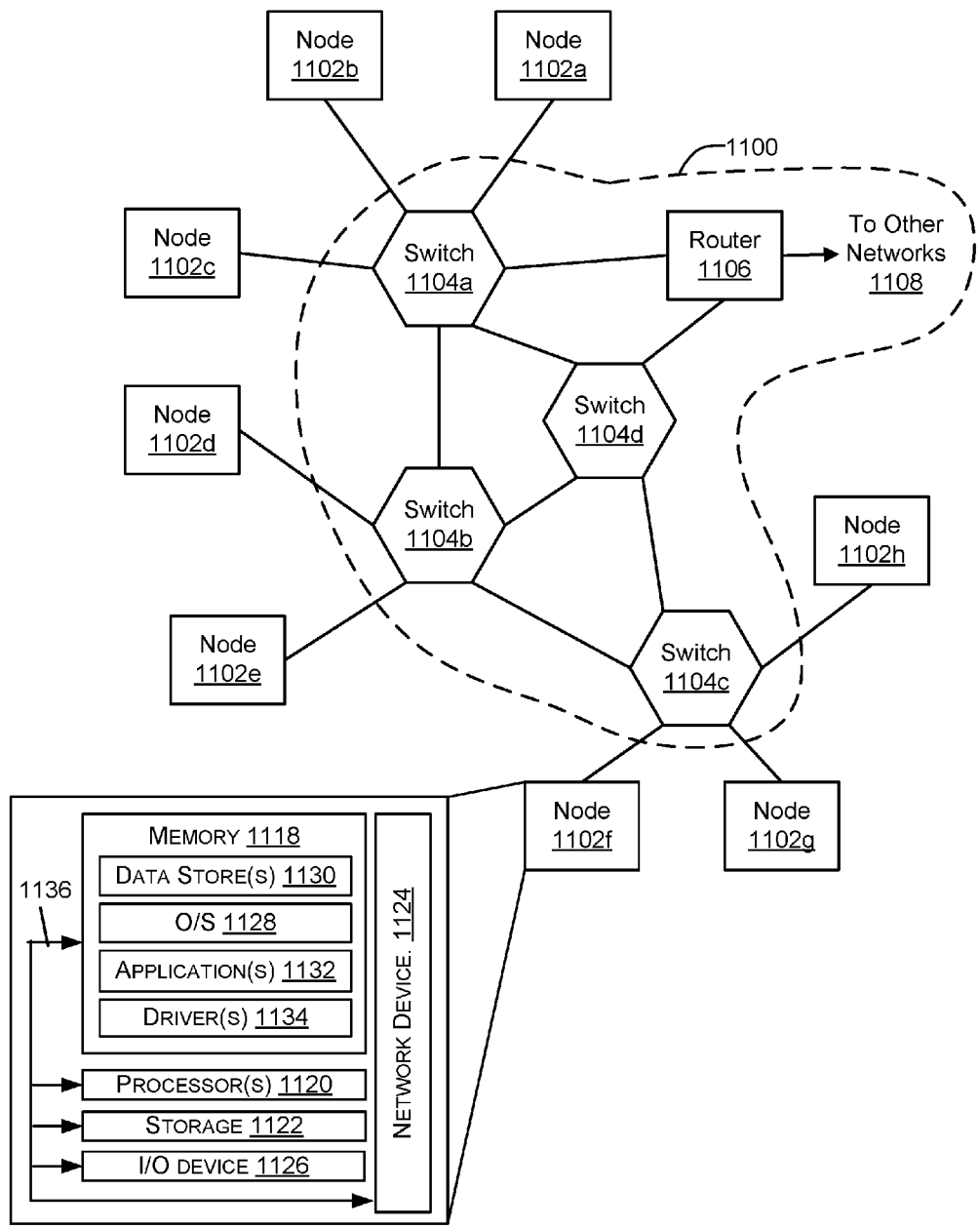
FIG. 11 illustrates an example architecture for features and systems described herein that includes one or more service provider computers and/or a user device connected via one or more networks, according to some embodiments.

FIG. 11 illustrates a network 1100, illustrating various different types of network devices 1000 of FIG. 10, such as nodes comprising the network device, switches and routers. In certain embodiments, the network 1100 may be based on a switched architecture with point-to-point links. As illustrated in FIG. 11, the network 1100 includes a plurality of switches 1104a-1104d, which may be arranged in a network. In some cases, the switches are arranged in a multi-layered network, such as a Clos network. A network device 1000 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1104a-1104d may be connected to a plurality of nodes 1102a-1102h and provide multiple paths between any two nodes.

The network 1100 may also include one or more network devices 1000 for connection with other networks 1108, such as other subnets, LANs, wide area networks (WANs), or the Internet, and may be referred to as routers 1106. Routers use headers and forwarding tables to determine the best path for forwarding the packets, and use protocols such as internet control message protocol (ICMP) to communicate with each other and configure the best route between any two devices.

In some examples, network(s) 1100 may include any one or a combination of many different types of networks, such as cable networks, the Internet, wireless networks, cellular networks and other private and/or public networks. Interconnected switches 1104a-1104d and router 1106, if present, may be referred to as a switch fabric, a fabric, a network fabric, or simply a network. In the context of a computer network, terms "fabric" and "network" may be used interchangeably herein.

Nodes 1102a-1102h may be any combination of host systems, processor nodes, storage subsystems, and I/O chassis that represent user devices, service provider computers or third party computers.

User devices may include computing devices to access an application 1132 (e.g., a web browser or mobile device application). In some aspects, the application 1132 may be hosted, managed, and/or provided by a computing resources service or service provider. The application 1132 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1108. Additionally, the user device(s) may be part of the distributed system managed by, controlled by, or otherwise part of the service provider computer(s) (e.g., a console device integrated with the service provider computers).

The node(s) of FIG. 11 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1132 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1102a-1102h may include at least one memory 1118 and one or more processing units (or processor(s) 1120). The processor(s) 1120 may be implemented in hardware, computer-executable instructions, firmware, or combinations thereof. Computer-executable instruction or firmware implementations of the processor(s) 1120 may include computer-executable or machine-executable instructions written in any suitable programming language to perform the various functions described.

In some instances, the hardware processor(s) 1120 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1118 may store program instructions that are loadable and executable on the processor(s) 1120, as well as data generated during the execution of these programs. Depending on the configuration and type of the node(s) 1102a-1102h, the memory 1118 may be volatile (such as RAM) and/or non-volatile (such as ROM, flash memory, etc.). The memory 1118 may include an operating system 1128, one or more data stores 1130, one or more application programs 1132, one or more drivers 1134, and/or services for implementing the features disclosed herein.

The operating system 1128 may support nodes 1102a-1102h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1128 may also be a proprietary operating system.

The data stores 1130 may include permanent or transitory data used and/or operated on by the operating system 1128, application programs 1132, or drivers 1134. Examples of such data include web pages, video data, audio data, images, user data, and so on. The information in the data stores 1130 may, in some implementations, be provided over the network(s) 1108 to user devices 1104. In some cases, the data stores 1130 may additionally or alternatively include stored application programs and/or drivers. Alternatively or additionally, the data stores 1130 may store standard and/or proprietary software libraries, and/or standard and/or proprietary application user interface (API) libraries. Information stored in the data stores 1130 may be machine-readable object code, source code, interpreted code, or intermediate code.

The drivers 1134 include programs that may provide communication between components in a node. For example, some drivers 1134 may provide communication between the operating system 1128 and additional storage 1122, network device 1124, and/or I/O device 1126. Alternatively or additionally, some drivers 1134 may provide communication between application programs 1132 and the operating system 1128, and/or application programs 1132 and peripheral devices accessible to the service provider computer. In many cases, the drivers 1134 may include drivers that provide well-understood functionality (e.g., printer drivers, display drivers, hard disk drivers, Solid State Device drivers). In other cases, the drivers 1134 may provide proprietary or specialized functionality.

The service provider computer(s) or servers may also include additional storage 1122, which may include removable storage and/or non-removable storage. The additional storage 1122 may include magnetic storage, optical disks, solid state disks, flash memory, and/or tape storage. The additional storage 1122 may be housed in the same chassis as the node(s) 1102a-1102h or may be in an external enclosure. The memory 1118 and/or additional storage 1122 and their associated computer-readable media may provide non-volatile storage of computer-readable instructions, data structures, program modules, and other data for the computing devices. In some implementations, the memory 1118 may include multiple different types of memory, such as SRAM, DRAM, or ROM.

The memory 1118 and the additional storage 1122, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1118 and the additional storage 1122 are examples of computer storage media. Additional types of computer storage media that may be present in the node(s) 1102a-1102h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1102a-1102h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1102a-1102h may also include I/O device(s) 1126, such as a keyboard, a mouse, a pen, a voice input device, a touch input device, a display, speakers, a printer, and the like. The node(s) 1102a-1102h may also include one or more communication channels 1136. A communication channel 1136 may provide a medium over which the various components of the node(s) 1102a-1102h can communicate. The communication channel or channels 1136 may take the form of a bus, a ring, a switching fabric, or a network.

The node(s) 1102a-1102h may also contain network device(s) 1126 that allow the node(s) 1102a-1102h to communicate with a stored database, another computing device or server, user terminals and/or other devices on the network(s) 1100. The network device(s) 1124 of FIG. 11 may include similar components discussed with reference to the network device 1000 of FIG. 10.

In some implementations, the network device 1126 is a peripheral device, such as a PCI-based device. In these implementations, the network device 1126 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 1008 may implement NVMe, and the network device 1126 may be connected to a computing system using a PCIe interface.

A PCI-based device may include one or more functions. A "function" describes operations that may be provided by the network device 1126. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1126 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 10, FIG. 11, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A network device, comprising:
a memory comprising a forwarding table configured to store a plurality of elements, wherein elements of the plurality of elements store forwarding information for forwarding of a network data packet by the network device, wherein the plurality of elements are further arranged into a plurality of buckets and each of the plurality of buckets includes a plurality of entries;
a programmable register; and
processing logic configured to:
generate a key and a hash using information from a network data packet;
select a bucket of the plurality of buckets using the hash; and
select forwarding information of an entry of the bucket, the entry selected using the key,
wherein a first entry of each of the plurality of buckets is associated with a first power domain, a second entry of each of the plurality of buckets is associated with a second power domain, and a powered state of at least the second power domain is selectable based on a configuration of the programmable register.

2. The network device of claim 1, wherein:
the selecting of the bucket selects multiple buckets of the plurality of buckets; and
the selecting of the forwarding information selects the forwarding information from an entry of the multiple buckets.

3. The network device of claim 1, wherein the processing logic is further configured to:
generate a plurality of hashes, each hash of the plurality of hashes associated with a bucket of the plurality of buckets;
select a set of entries including an entry from a bucket of the plurality of buckets associated with each of the plurality of hashes; and
select the forwarding information from the set of entries using a longest prefix match technique.

4. The network device of claim 1, wherein the network data packet from which a key and hash is generated comprises one or more of an IPv6 network address, an IPv6 virtual routing and forwarding identifier, an IPv4 network address, and an IPv4 virtual routing and forwarding identifier.

5. A device, comprising:
memory comprising a data table configured to store a plurality of elements, wherein the plurality of elements are arranged into a plurality of buckets and each of the plurality of buckets comprising a plurality of entries;
a first power domain associated with a first entry of each bucket from the plurality of buckets;
a second power domain associated with a second entry of each bucket from the plurality of buckets;
processing logic configured to search for a particular value stored as an element of the plurality of elements by selecting buckets of the plurality of buckets and selecting at least one entry of each of the buckets; and
a programmable register, wherein the device is configured to select a powered state of the second power domain based on a configuration of the programmable register.

6. The device of claim 5, wherein the data table is a forwarding table; and
wherein the elements of the plurality of elements include forwarding information for forwarding of a network data packet by the device.

7. The device of claim 5, wherein the processing logic is configured to select the buckets of the plurality of buckets based on a hash generated using a particular data set, the particular data set being used to obtain the particular value.

8. The device of claim 5, wherein the memory is arranged within an integrated circuit; and
wherein an amount of the memory used to store the data table is variable according to the configuration of the programmable register.

9. The device of claim 5, wherein the first power domain is associated with a first integrated circuit; and
wherein the second power domain is associated with a second memory integrated circuit.

10. The device of claim 5, wherein the device is further configured to select the powered state of the second power domain to reduce power consumption of the device.

11. The device of claim 5, wherein the second power domain is associated with a plurality of entries of each bucket of the plurality of buckets.

12. The device of claim 5, wherein the processing logic is configured to select the buckets of the plurality of buckets in a sequential order; and
wherein the entries of a bucket of the buckets are searched prior to selecting a different bucket of the buckets.

13. The device of claim 5, wherein the processing logic is configured to select each of the buckets of the plurality of buckets in parallel and
wherein entries of each bucket of the buckets are searched concurrently.

14. A device, comprising:
a memory comprising a data table configured to store a plurality of elements, wherein the plurality of elements are arranged into a plurality of buckets and each of the plurality of buckets comprising a plurality of entries;
a first power domain associated with a first bucket from the plurality of buckets;
a second power domain associated with a second bucket from the plurality of buckets;
processing logic configured to search for a particular value stored as an element of the plurality of elements by searching buckets of the plurality of buckets and at least one entry of each of the buckets; and
a programmable register, wherein the device is configured to select a powered state of the second power domain based on a configuration of the programmable register.

15. The device of claim 14, wherein the second power domain is associated with buckets of the plurality of buckets.

16. The device of claim 14, wherein the programmable register is configurable upon activation of the device and the processing logic searches for the particular value based upon the configuration of the programmable register at activation of the device.

17. The device of claim 14, wherein the programmable register is configurable dynamically while the device is active and the processing logic searches for the particular value based upon a configuration of the programmable register.

18. The device of claim 14, wherein the second power domain is associated with the processing logic configured to search for a particular value stored in the second bucket; and wherein a powered state of the processing logic configured to search for a particular value stored in the second bucket is selected in accordance with the powered state of the second power domain.

19. The device of claim 14, wherein the particular value is associated with a network data packet received by the device; and wherein the processing logic is configured to determine a destination to forward the network data packet based on the particular value.

20. The device of claim 14, wherein the processing logic is configured to search a number of buckets of the plurality of buckets based on the configuration of the programmable register.

* * * * *